United States Patent
Shim et al.

(10) Patent No.: US 6,512,883 B2
(45) Date of Patent: *Jan. 28, 2003

(54) CONTROL APPARATUS AND METHOD FOR REPRODUCING DATA FROM A DIGITAL VIDEO DISK AT HIGH SPEED

(75) Inventors: Jae-Seong Shim, Seoul (KR); Jong-Sang Yim, Suwon (KR); Jeong-Joo Jeong, Suwon (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/962,397

(22) Filed: Oct. 31, 1997

(65) Prior Publication Data

US 2001/0043802 A1 Nov. 22, 2001

(30) Foreign Application Priority Data

Jun. 28, 1997 (KR) .............................. 97-28669

(51) Int. Cl.[7] .............................. H04N 5/91; H04N 5/85
(52) U.S. Cl. .......................................... 386/95; 386/126
(58) Field of Search .............................. 386/46, 95, 111, 386/112, 125, 126, 94, 68; 380/20, 37; H04N 5/91, 5/85

(56) References Cited

U.S. PATENT DOCUMENTS

| | | | | |
|---|---|---|---|---|
| 5,546,461 A | * | 8/1996 | Ibaraki et al. | 380/20 |
| 5,802,239 A | * | 9/1998 | Fujinami | 386/47 |
| 5,870,523 A | * | 2/1999 | Kikuchi et al. | 386/95 |
| 5,917,914 A | * | 6/1999 | Shaw et al. | 380/42 |
| 5,949,953 A | * | 9/1999 | Shirakawa et al. | 386/95 |
| 5,963,704 A | * | 10/1999 | Mimura et al. | 386/95 |
| 5,991,502 A | * | 11/1999 | Kawankami et al. | 386/109 |
| 5,999,694 A | * | 12/1999 | Yasuda et al. | 386/70 |
| 6,006,004 A | * | 12/1999 | Moriyama et al. | 386/26 |
| 6,229,951 B1 | * | 5/2001 | Schultz et al. | 386/68 |
| 6,233,394 B1 | * | 5/2001 | Jeong et al. | 386/126 |

* cited by examiner

Primary Examiner—Huy Nguyen
(74) Attorney, Agent, or Firm—Staas & Halsey LLP

(57) ABSTRACT

A control apparatus for reproducing data from a digital video disk at high speed and a method therefor. The control apparatus including a descrambler for descrambling the data which is read from the digital video disk, demodulated and error-corrected, and detecting a navigation pack sector from the data, a navigation interrupt generator for generating a navigation interrupt if the navigation pack sector is detected by the descrambler, a memory for storing the descrambled data, and a microprocessor for determining a next reproducing position of the digital video disk on the basis of information of the navigation pack sector contained in the descrambled data by accessing the memory if the navigation interrupt is detected, and controlling a driving of the digital video disk.

28 Claims, 10 Drawing Sheets

| ADDRESS | 7BITS | 6BITS | 5BITS | 4BITS | 3BITS | 2BITS | 1BIT | 0BIT |
|---|---|---|---|---|---|---|---|---|
| 70 | | | | ADR20 | ADR19 | ADR18 | ADR17 | ADR16 |
| 71 | ADR15 | ADR14 | ADR13 | ADR12 | ADR11 | ADR10 | ADR9 | ADR8 |
| 72 | ADR7 | ADR6 | ADR5 | ADR4 | ADR3 | ADR2 | ADR1 | ADR0 |
| 73 | RDT7 | RDT6 | RDT5 | RDT4 | RDT3 | RDT2 | RDT1 | RDT0 |

FIG. 4A

| ADDRESS | 7BITS | 6BITS | 5BITS | 4BITS | 3BITS | 2BITS | 1BIT | 0BIT |
|---|---|---|---|---|---|---|---|---|
| 86 | B9,B8 ||||||||
| 87 | B7~B0 ||||||||

FIG. 4B

| ADDRESS | 7BITS | 6BITS | 5BITS | 4BITS | 3BITS | 2BITS | 1BIT | 0BIT |
|---|---|---|---|---|---|---|---|---|
| 9C | \multicolumn{8}{c|}{B31~B24} |
| 9D | B23~B16 |
| 9E | B15~B8 |
| 9F | B7~B0 |

FIG. 4C

| | CONTENT | NUMBER OF BYTE |
|---|---|---|
| FWDI VIDEO | NEXT VOBU START ADDRESS WITH VIDEO DATA | 4BYTES |
| FWDI 240 | +240 VOBU START ADDRESS AND VIDEO EXISTENCE FLAG | 4BYTES |
| FWDI 120 | +120 VOBU START ADDRESS AND VIDEO EXISTENCE FLAG | 4BYTES |
| FWDI 60 | +60 VOBU START ADDRESS AND VIDEO EXISTENCE FLAG | 4BYTES |
| FWDI 20 | +20 VOBU START ADDRESS AND VIDEO EXISTENCE FLAG | 4BYTES |
| FWDI 15 | +15 VOBU START ADDRESS AND VIDEO EXISTENCE FLAG | 4BYTES |
| FWDI 14 | +14 VOBU START ADDRESS AND VIDEO EXISTENCE FLAG | 4BYTES |
| FWDI 13 | +13 VOBU START ADDRESS AND VIDEO EXISTENCE FLAG | 4BYTES |
| FWDI 12 | +12 VOBU START ADDRESS AND VIDEO EXISTENCE FLAG | 4BYTES |
| FWDI 11 | +11 VOBU START ADDRESS AND VIDEO EXISTENCE FLAG | 4BYTES |
| FWDI 10 | +10 VOBU START ADDRESS AND VIDEO EXISTENCE FLAG | 4BYTES |
| FWDI 9 | +9 VOBU START ADDRESS AND VIDEO EXISTENCE FLAG | 4BYTES |
| FWDI 8 | +8 VOBU START ADDRESS AND VIDEO EXISTENCE FLAG | 4BYTES |
| FWDI 7 | +7 VOBU START ADDRESS AND VIDEO EXISTENCE FLAG | 4BYTES |
| FWDI 6 | +6 VOBU START ADDRESS AND VIDEO EXISTENCE FLAG | 4BYTES |
| FWDI 5 | +5 VOBU START ADDRESS AND VIDEO EXISTENCE FLAG | 4BYTES |
| FWDI 4 | +4 VOBU START ADDRESS AND VIDEO EXISTENCE FLAG | 4BYTES |
| FWDI 3 | +3 VOBU START ADDRESS AND VIDEO EXISTENCE FLAG | 4BYTES |
| FWDI 2 | +2 VOBU START ADDRESS AND VIDEO EXISTENCE FLAG | 4BYTES |
| FWDI 1 | +1 VOBU START ADDRESS AND VIDEO EXISTENCE FLAG | 4BYTES |
| FWDI NEXT | NEXT VOBU START ADDRESS AND VIDEO EXISTENCE FLAG | 4BYTES |
| BWDI PREV | PREVIOUS VOBU START ADDRESS AND VIDEO EXISTENCE FLAG | 4BYTES |
| BWDI 1 | −1 VOBU START ADDRESS AND VIDEO EXISTENCE FLAG | 4BYTES |
| BWDI 2 | −2 VOBU START ADDRESS AND VIDEO EXISTENCE FLAG | 4BYTES |
| BWDI 3 | −3 VOBU START ADDRESS AND VIDEO EXISTENCE FLAG | 4BYTES |
| BWDI 4 | −4 VOBU START ADDRESS AND VIDEO EXISTENCE FLAG | 4BYTES |
| BWDI 5 | −5 VOBU START ADDRESS AND VIDEO EXISTENCE FLAG | 4BYTES |
| BWDI 6 | −6 VOBU START ADDRESS AND VIDEO EXISTENCE FLAG | 4BYTES |
| BWDI 7 | −7 VOBU START ADDRESS AND VIDEO EXISTENCE FLAG | 4BYTES |
| BWDI 8 | −8 VOBU START ADDRESS AND VIDEO EXISTENCE FLAG | 4BYTES |
| BWDI 9 | −9 VOBU START ADDRESS AND VIDEO EXISTENCE FLAG | 4BYTES |
| BWDI 10 | −10 VOBU START ADDRESS AND VIDEO EXISTENCE FLAG | 4BYTES |
| BWDI 11 | −11 VOBU START ADDRESS AND VIDEO EXISTENCE FLAG | 4BYTES |
| BWDI 12 | −12 VOBU START ADDRESS AND VIDEO EXISTENCE FLAG | 4BYTES |
| BWDI 13 | −13 VOBU START ADDRESS AND VIDEO EXISTENCE FLAG | 4BYTES |
| BWDI 14 | −14 VOBU START ADDRESS AND VIDEO EXISTENCE FLAG | 4BYTES |
| BWDI 15 | −15 VOBU START ADDRESS AND VIDEO EXISTENCE FLAG | 4BYTES |
| BWDI 20 | −20 VOBU START ADDRESS AND VIDEO EXISTENCE FLAG | 4BYTES |
| BWDI 60 | −60 VOBU START ADDRESS AND VIDEO EXISTENCE FLAG | 4BYTES |
| BWDI 120 | −120 VOBU START ADDRESS AND VIDEO EXISTENCE FLAG | 4BYTES |
| BWDI 240 | −240 VOBU START ADDRESS AND VIDEO EXISTENCE FLAG | 4BYTES |
| BWDI VIDEO | PREVIOUS VOBU START ADDRESS WITH VIDEO DATA | 4BYTES |
| | TOTAL | 168BYTES |

FIG. 8

CONTROL APPARATUS AND METHOD FOR REPRODUCING DATA FROM A DIGITAL VIDEO DISK AT HIGH SPEED

BACKGROUND OF THE INVENTION

1. Field of the Invention

The present invention relates to a control apparatus and method for reproducing data stored on a digital video disk (DVD), and more particularly, to a control apparatus and method for controlling a digital video disk reproducing system so as to increase a reproducing speed of the data stored on the digital video disk.

2. Description of the Related Art

A digital video disk, which is one type of digital moving picture disk media, is a multimedia storage device for storing data of high picture quality and high sound quality for the next generation, and stores at least two hours worth of digital images according to the Moving Picture Experts Group (MPEG)-2 standard.

To achieve a fast forward (FF), fast backward (FB) or navigation reproducing function, control means, such as a microprocessor, for controlling overall operations of a digital video disk reproducing system should collect navigation information. However, in a conventional structure of the digital video disk reproducing system, since the microprocessor can not directly or indirectly access a memory contained in a data processor and can not obtain descrambled data from the memory contained in the data processor, the microprocessor obtains the navigation information from another memory which is externally or internally installed in a video/audio decoder connected to a subsequent stage of the data processor. Further, since error flag information indicating whether or not data transmitted to the video/audio decoder from the data processor has an error is generated after corresponding data is transmitted, it is difficult to judge whether or not the currently transmitted data has an error. Consequently, it takes a long time for the microprocessor to collect the navigation information, and the user who demands the FF, FB or navigation reproducing function must wait a long time. Furthermore, when there is a defect in the digital video disk during FF or FB reproduction, if the data is not restored at once, defective data may be transmitted to the video/audio decoder, and an unexpected system error may be generated.

SUMMARY OF THE INVENTION

Accordingly, it is an object of the present invention to provide a control apparatus and method for controlling a digital video disk so as to increase an FF, FB or other reproducing speed of data stored on the digital video disk.

Additional objects and advantages of the invention will be set forth in part in the description which follows, and, in part, will be obvious from the description, or may be learned by practice of the invention.

The foregoing object of the present invention is achieved by providing a control apparatus for reproducing data from a digital video disk at high speed which includes a descrambler to descramble data which is read from the digital video disk, demodulated and error-corrected, and to detect a navigation pack sector from the descrambled data, a navigation interrupt generator to generate a navigation interrupt if the descrambler detects the navigation pack sector, a memory to store the descrambled data, and a microprocessor to determine a next reproducing position of the digital video disk on the basis of information of the navigation pack sector contained in the descrambled data by accessing the memory if the microprocessor receives the navigation interrupt, and to control a driving of the digital video disk.

BRIEF DESCRIPTION OF THE DRAWINGS

These and other objects and advantages of the invention will become apparent and more readily appreciated from the following description of the preferred embodiment, taken in conjunction with the accompanying drawings of which:

FIGS. 4A, 4B and 4C are diagrams illustrating a configuration of a register portion shown in FIG. 2;

FIG. 8 is a table for Storing Video Object Search Information (VOBU_SRI) according to the embodiment of the present invention.

DETAILED DESCRIPTION OF THE PREFERRED EMBODIMENT

Figure 1:
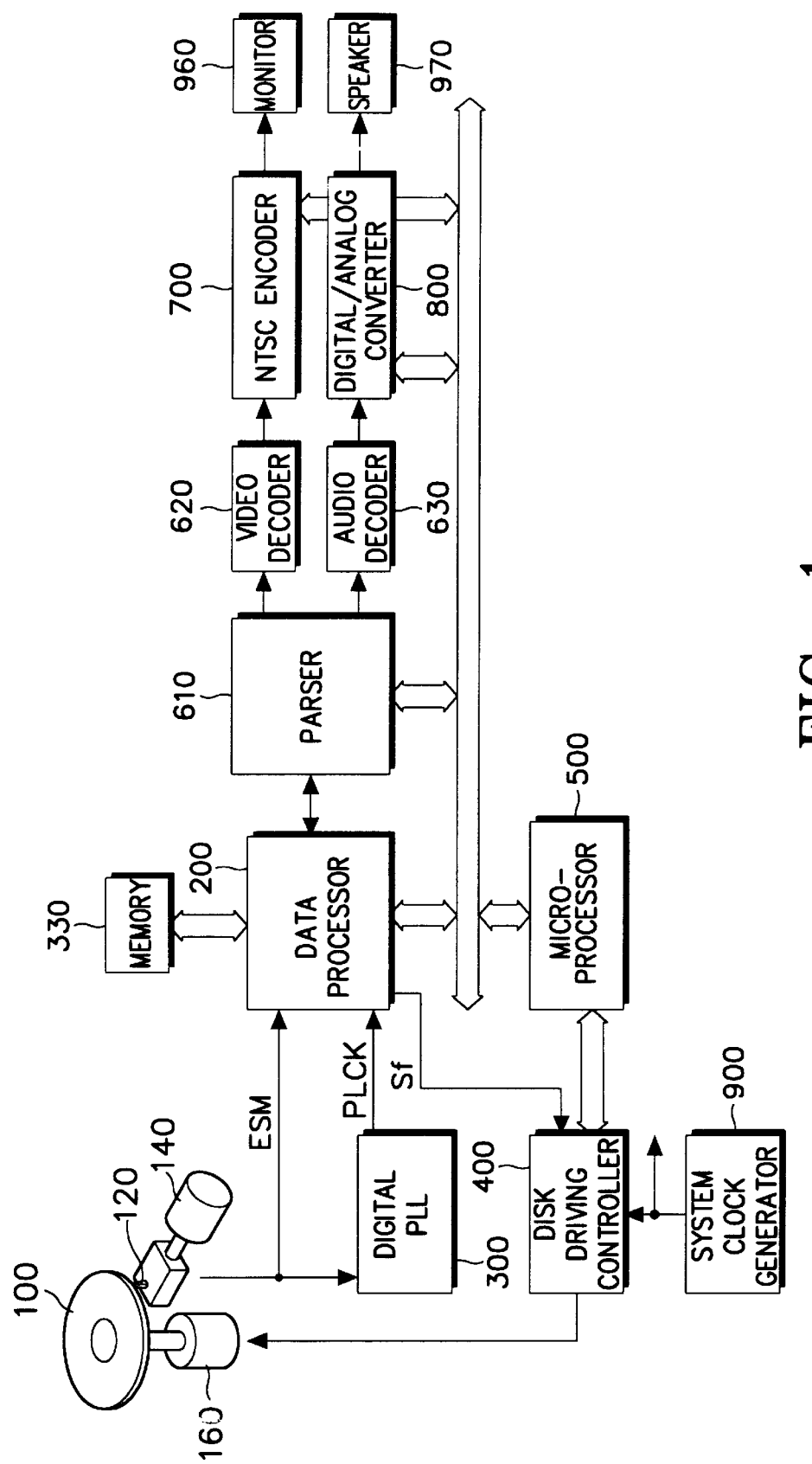
FIG. 1 is a block diagram illustrating a schematic configuration of a digital video disk reproducing system according to an embodiment of the present invention.

Reference will now be made in detail to the present preferred embodiment of the present invention, examples which are illustrated in the accompanying drawings, wherein like reference numerals refer to like elements throughout.

A preferred embodiment of the present invention will be more specifically described hereinbelow with reference to the attached drawings. As already noted, like reference numerals or symbols designate like elements throughout. In the following description, numerous specific details, such as elements constituting a circuit, are set forth to provide a more thorough understanding of the present invention. It will be apparent, however, to one skilled in the art, that the present invention may be practiced without these specific details. Furthermore, well-known functions or constructions which may unnecessarily obscure the subject matter of the present invention will not be described in detail.

FIG. 1 is a diagram illustrating the schematic configuration of a digital video disk reproducing system applied to an embodiment of the present invention.

When data from an optical disk 100 is to be reproduced, a disk motor 160 starts to rotate at a given speed. An optical pick-up unit 140 having a head 120 carries out tracking and focusing control to convert information (data) of the disk 100 into an analog RF (Radio Frequency) signal. The RF signal is shaped to a pulse waveform, and a data stream ESM is transmitted to a digital PLL (Phase Locked Loop) 300 and to a data processor 200. The digital PLL 300 includes a phase comparator, a voltage controlled oscillator, a demultiplier, etc., and generates a clock synchronized with a signal reproduced from any optical disk. A disk driving controller 400 controls a constant linear velocity of the rotation of the disk 100 and disk related operations in consideration of frequency servo, phase servo, etc. according to a frame synchronizing signal Sf generated from a synchronous detector (not shown) of the data processor 200. A memory 330 stores data for error correction and a variable bit rate (VBR) etc., and is used for data buffering. The data processor 200 demodulates data read from the disk 100 to a state prior to being written on the disk 100. The demodulated data is stored in the memory 330 and again read by a unit of block for the error correction. Data error-corrected through the data processor 200 is again stored in the memory 330. Moreover, the data processor 200 descrambles data read from the memory 330 and transmits the descrambled data to a parser 610. The parser 610 transmits an audio signal and a video signal to an AC3/MPEG audio decoder 630 and an MPEG-2 video decoder 620, respectively. A microprocessor 500 is a system controller for controlling overall operations of the optical disk reproducing system. If the video and audio decoders 620 and 630 are energized (that is, if the video and audio signals start to be reproduced) by a user's request or by a demand of control information within the disk, the video and audio decoders 620 and 630 make a request for data to the data processor 200. In this case, the microprocessor 500 controls the data processor 200 so as to carry out the error correction and descrambling from data within the disk 100 and to transmit the error-corrected and descrambled data to the video and audio decoders 620 and 630. Video and audio data demodulated from the video and audio decoders 620 and 630 are transmitted to an NTSC (or PAL) encoder 700 and a digital/analog converter 800 and generated through a monitor 960 and a speaker 970, respectively.

Figure 2:
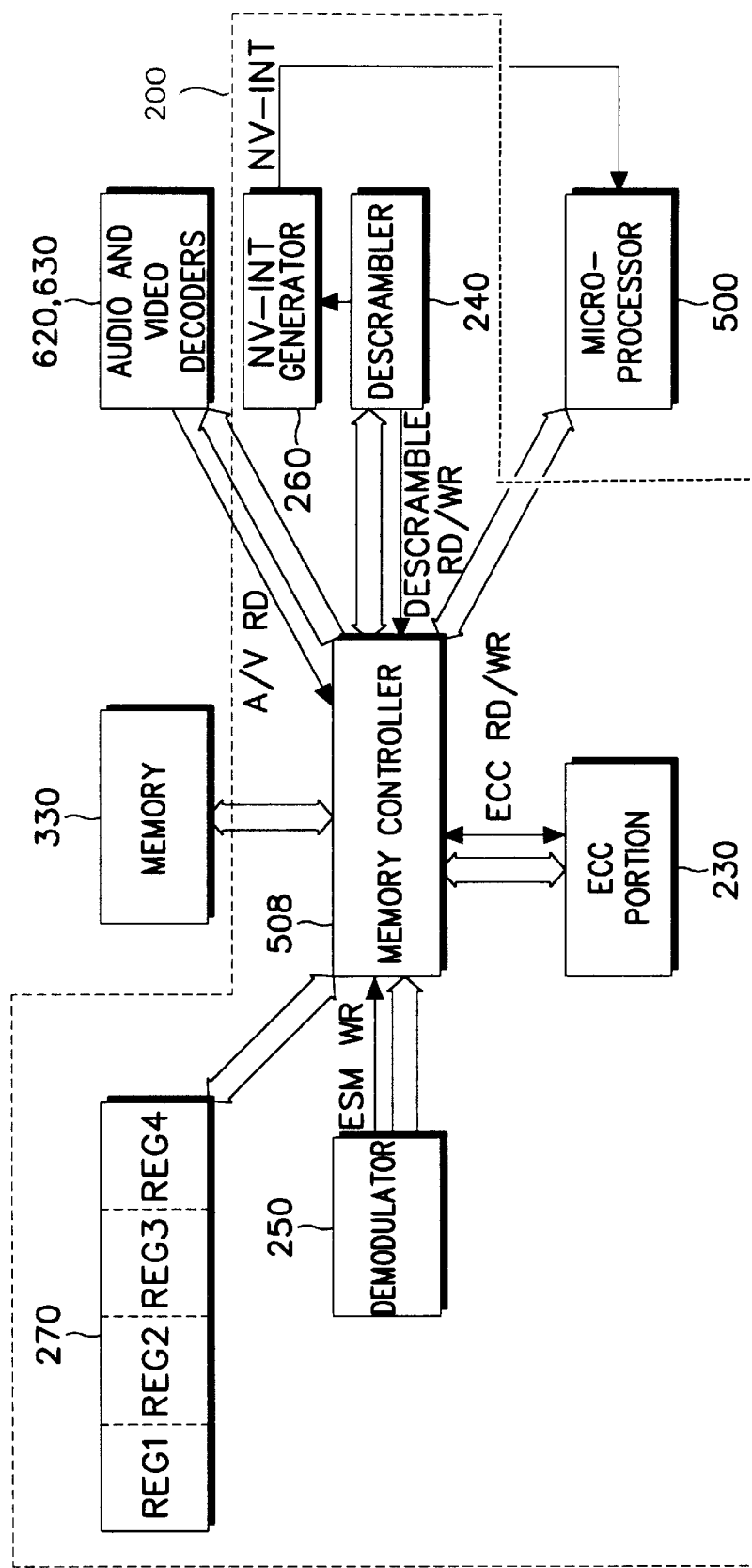
FIG. 2 is a block diagram illustrating the detailed configuration of a data processor and its peripheral parts shown in FIG. 1.

FIG. 2 is a block diagram illustrating the detailed configuration of the data processor 200 and its peripheral parts according to the embodiment of the present invention.

A demodulator 250 demodulates the data stream ESM to a unit of symbol including prescribed bits. The demodulator 250 has, for example, a 32-bit shift register and a sixteen-to-eight demodulator. The data stream ESM is supplied to the shift register, and the 16 least significant bits (or the 16 most significant bits) among the 32 bits generated from the shift register are transmitted to the sixteen-to-eight demodulator. The sixteen-to-eight demodulator converts 16-bit data into 8-bit data constituting one symbol. An error correcting code (ECC) portion 230 performs the error correction in the horizontal and vertical directions with respect to an error correcting block including data read from the disk 100 which is a digital video disk. The horizontal and vertical directions may be (182, 172, 11) and (208, 192, 17), respectively. That is, the lengths of code words in the horizontal and vertical directions are 182 and 208, respectively. Main data except a parity in the horizontal and vertical directions are 172 and 192, respectively; and intervals of the code words in the horizontal and vertical directions are 11 and 17, respectively. For this error correction, the memory 330 stores identification (ID) data and the main data generated from the demodulator 250 by a unit of block to form the error correcting block. The error correcting block includes data for 16 sectors. Moreover, the memory 330 performs the data buffering for the error correction of both directions and stores the error-corrected data. Since the main data among the error-corrected data stored in the memory 330 has been scrambled before it is written in the disk 100, a descrambler 240 receives and then descrambles the main data to restore the scrambled data to original data. Moreover, the descrambler 240 stores the restored data in the memory 330 and detects a navigation pack (NV_PCK) sector from the restored data. A memory controller 508 accesses the memory 330 for the error correction of the demodulated data and the descrambling of the error-corrected data. That is, the memory controller 508 reads out data to be descrambled from the memory 330 or controls the memory 330 so as to transmit the descrambled data to the video and audio decoders 620 and 630 according to a transmission control signal generated from the microprocessor 500. The video and audio decoders 620 and 630 transmit audio and video transmission request signals A/V RD to the memory controller 508. Then the microprocessor 500 transmits the transmission control signal to the memory controller 508. A navigation interrupt generator 260 generates a navigation interrupt signal NV_INT. A register portion 270 has 4 registers. A first register REG1 is a microprocessor memory read register; a second register REG2 is a microprocessor memory write register; a third register REG3 is a navigation pack unit number register; and a fourth register REG is a navigation pack ID address register.

Figure 3:
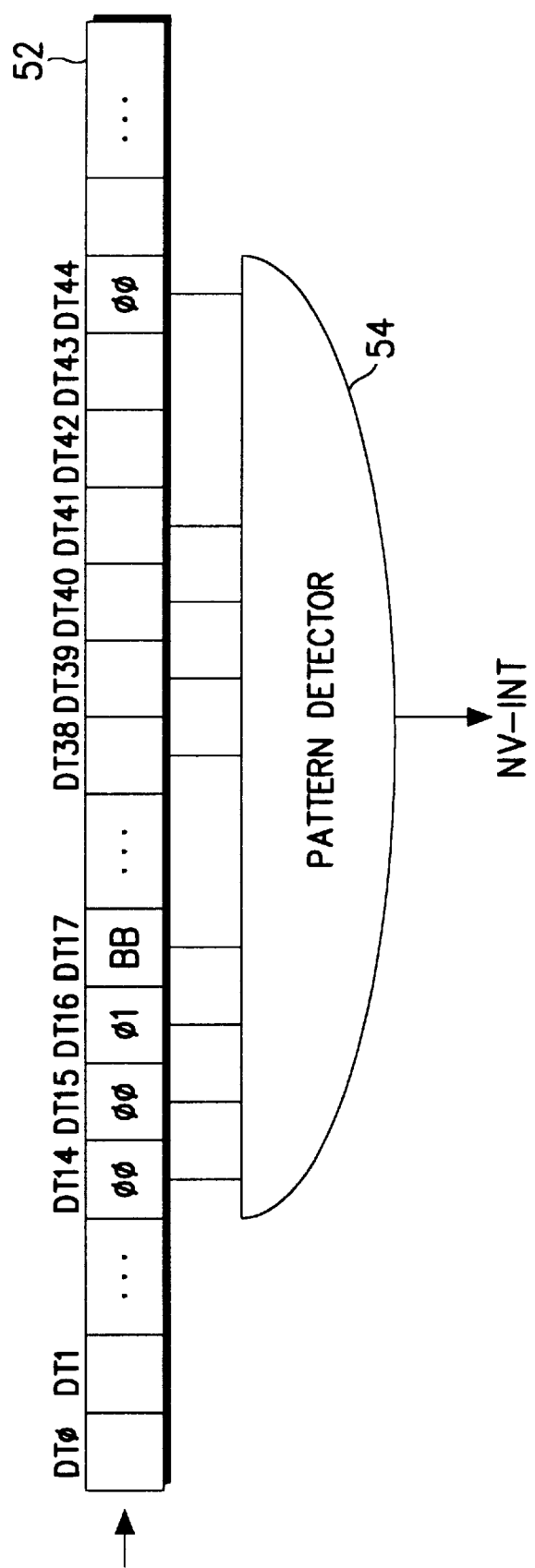
FIG. 3 is a diagram illustrating the configuration of a navigation interrupt generator shown in FIG. 2.

FIG. 3 illustrates the configuration of the navigation interrupt generator 260 shown in FIG. 2. The data descrambled from the descrambler 240 is sequentially supplied to a shift register 52. A pattern detector 54 receives specific shift data and detects a given pattern, that is, a pack header contained in the navigation pack (NV_PCK) sector. If the pack header is detected, the pattern detector 54 generates the navigation interrupt signal NV_INT to inform the microprocessor 500 that the pack header has been detected.

FIGS. 4A, 4B and 4C are diagrams illustrating the configuration of the register portion 270 shown in FIG. 2. FIG. 4A shows a register having addresses for read-accessing the memory 330 by the microprocessor 500. Addresses 70–72 are addresses of the memory 330. An address 73 has a memory data value of a corresponding address.

FIG. 4B shows a register having addresses of the memory 330 in which a navigation pack sector is stored. The microprocessor 500 obtains a desired address of the memory 330 from the register of FIG. 4B and calculates the address by a given calculation equation. Then the microprocessor 500 can access navigation pack data by a unit of byte by writing the calculated value into the addresses 70–72 of the register of FIG. 4A. The register of FIG. 4B has each address of a unit of 2-kilobyte. The addresses 70–72 indicated in FIG. 4A are addresses of a unit of byte. In an address 87, B7-B0 indicate bit 7-bit 0 among 10 bits constituting a corresponding register. The same principle is applied to the other address 86.

FIG. 4C shows a register having addresses of the disk 100 in which the navigation pack is stored, such addresses being referred to as ID addresses hereinafter. In an address 9C, B31-B24 indicate bit 31-bit 24 among 32 bits constituting a corresponding register. The same principle is applied to the other addresses 9D through 9F.

The navigation interrupt generator 260 detects the navigation pack sector from the descrambler 240 and stores the ID address of the disk 100 having the navigation pack sector in the register of FIG. 4C. Thereafter, the navigation interrupt generator 260 stores the address of the memory 330 in which navigation pack sector data is stored in the register of FIG. 4B, and transmits the navigation interrupt signal NV_INT to the microprocessor 500. Then the microprocessor 500 accesses the registers of FIGS. 4B and 4C, and accesses the navigation pack data of the memory 330 by using the register of FIG. 4A.

Figure 5:
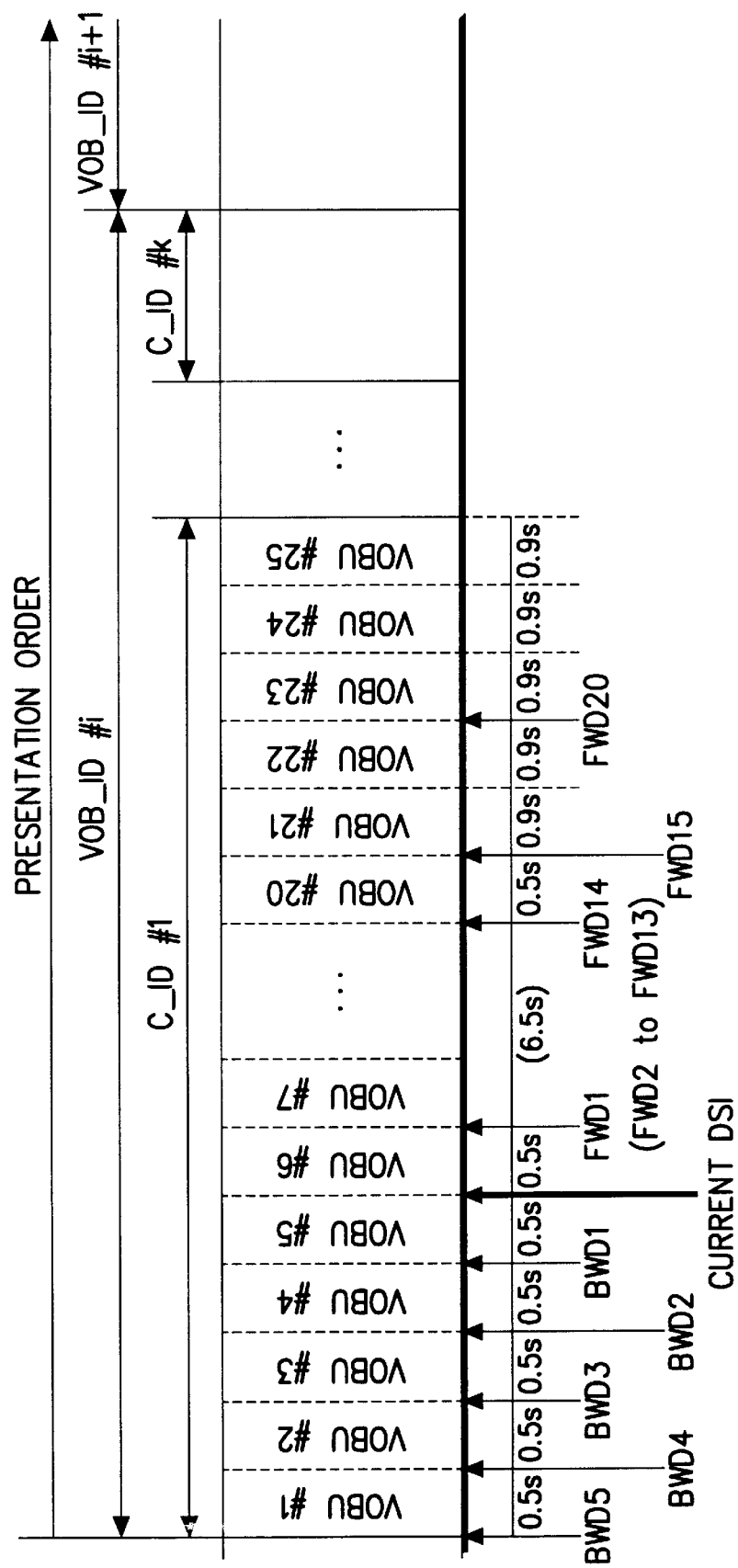
FIG. 5 is a drawing illustrating the structure of a video object ID according to the embodiment of the present invention.

FIG. 5 illustrates the structure of a video object ID used in the embodiment of the present invention. This structure is disclosed in the digital video disk standard.

Figure 6:
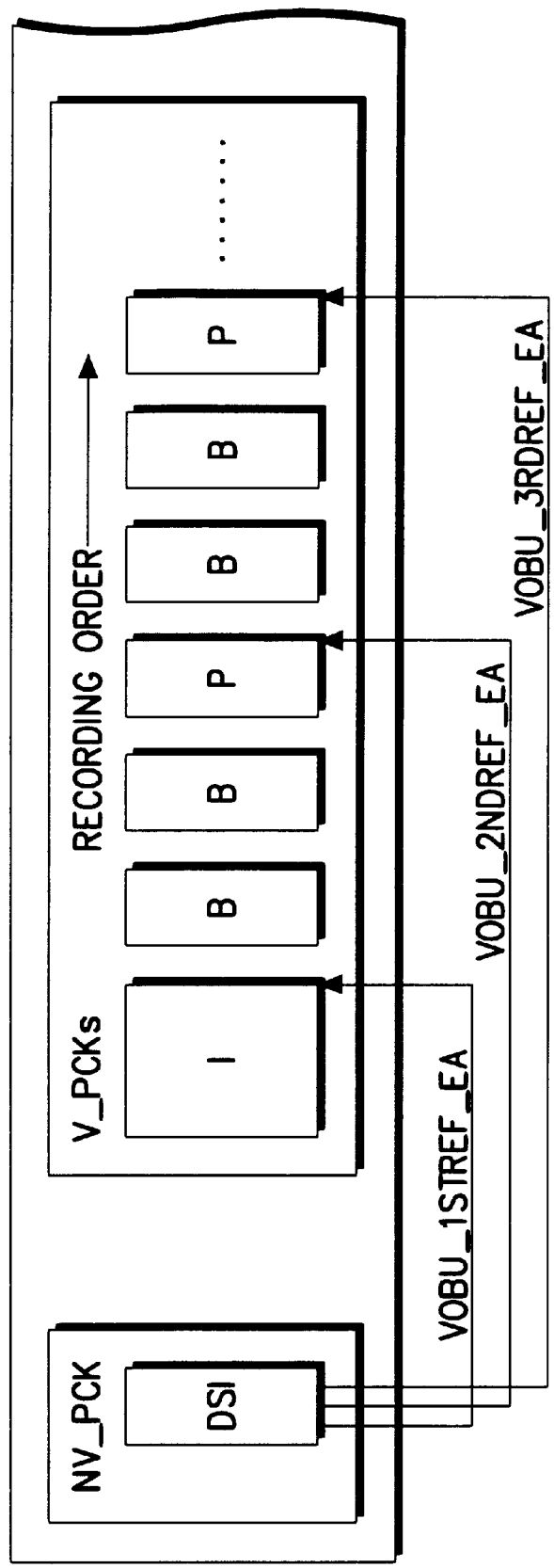
FIG. 6 is a drawing illustrating the configuration of one video object unit shown in FIG. 5.

FIG. 6 illustrates the configuration of one video object unit shown in FIG. 5. The video object unit includes a navigation pack NV_PCK sector of 2048 bytes, and I picture, B picture, B picture, P picture, B picture, B picture, P picture, I picture, etc. in a sequential recording order.

Figure 7:
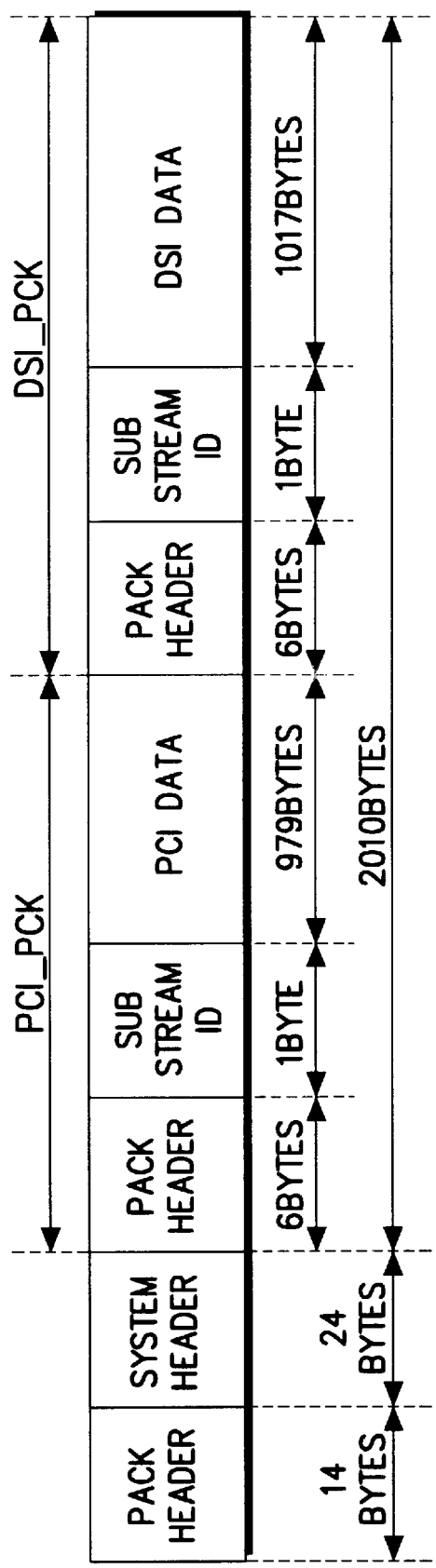
FIG. 7 is a drawing illustrating the structure of a navigation pack sector shown in FIG. 6.

FIG. 7 illustrates the structure of the navigation pack (NV_PCK) sector shown in FIG. 6. The navigation pack (NV_PCK) sector is used for a navigation function together with volume information of the disk 100. The navigation function is to obtain information needed to search for a path of a desired position on the disk 100. As shown, one pack sector has 2048 bytes. The detection of a system header start code (00, 00, 01, BB) is started from the 15th byte. The detection of a packet header (00, 00, 01, BF, , ) is started from the 39th byte. When a sub stream ID is '00' or '01', the navigation interrupt generator 260 generates the navigation interrupt signal NV_INT. The sub stream ID of '00' indicates that the following 979 bytes are presentation control information (PCI) data, and the sub stream ID of '01' indicates that the following 1,017 bytes are disc search information (DSI) data.

FIG. 8 illustrates a table for storing Video Object Unit Search Information (VOBU_SRI) according to the embodiment of the present invention. FWDI indicates forward information and BWDI indicates backward information, corresponding to FWD indicating forward and BWD indicating backward, respectively, in FIG. 5.

Figure 9:
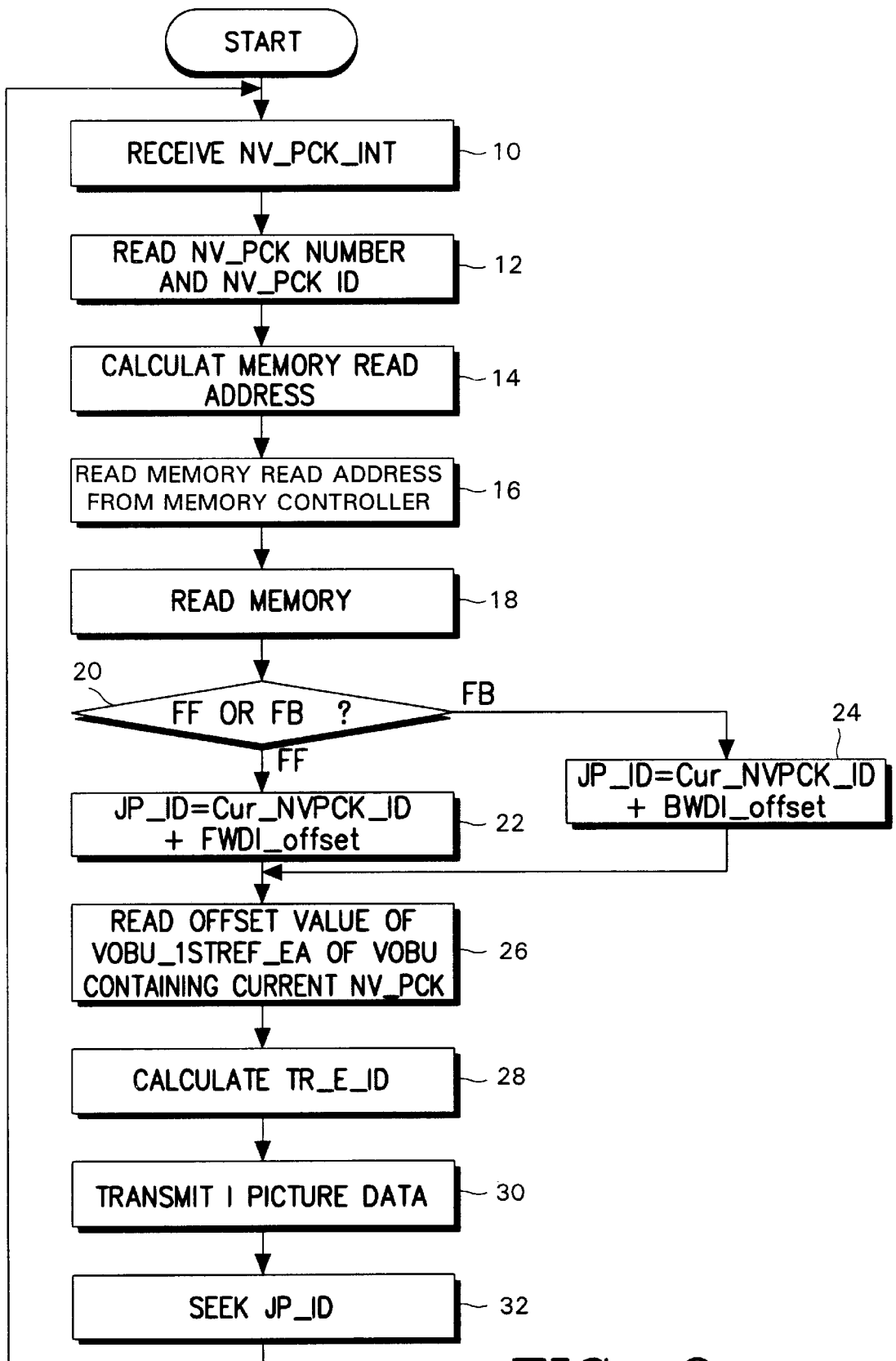
FIG. 9 is a flow chart illustrating a control operation for reproducing the digital video disk at high speed according to the embodiment of the present invention.

FIG. 9 is a flow chart illustrating a control operation for reproducing data from the digital video disk at high speed.

While the data from the digital video disk is being reproduced, if the navigation pack NV_PCK sector is detected by the descrambler 240, the data processor 200 judges that a new VOBU (video object unit) is started. If the descrambling has ended, the data processor 200 stores the descrambled data in the memory 330 and generates the navigation interrupt signal NV_INT through the navigation interrupt generator 260. Thereafter, the data processor 200 determines a navigation pack unit number and an ID of a corresponding VOBU which are respectively stored in the second and third registers shown in FIGS. 4B and 4C.

For convenience, it is assumed that the user selects a FF mode. If the navigation interrupt signal NV_INT is detected by the NV_INT generator 260 at step 10, the microprocessor 500 reads, at step 12, the navigation pack unit number and the navigation pack ID of a currently detected VOBU from the second and third registers of the register portion 270, respectively. The navigation pack unit number is a sector number indicating a position of the memory where the navigation pack unit exists. At step 14, the microprocessor 500 calculates a memory read address ADD and stores the calculated address in the addresses 70–72 of the register of FIG. 4A. The memory read address ADD is calculated by the following equation (1). This calculation is for obtaining an address of a unit of byte.

$$ADD = 2.48 \times U_{NO} + OFF1 + OFF2 \tag{1}$$

where $U_{NO}$ indicates the navigation unit number, OFF1 is an offset value of a VOBU_SRI, and OFF2 is an offset value corresponding to the double speed of the VOBU_SRI. The VOBU_SRI is shown in FIG. 8. Referring to FIG. 7, the offset value of the VOBU_SRI represents the number of bytes including the position of the VOBU_SRI following a Disk Search Information-General Information (DSI_GI) of a Disk Search Information-Pack (DSI_PCK) from the start position (pack header) of a corresponding navigation pack. The offset value corresponding to the double speed of the VOBU_SRI means the number of bytes including a double speed term within the VOBU_SRI from the start position of the VOBU_SRI. For example, the ID to be jumped differs according to the double speed, quadruple speed, etc. The offset value corresponding to the double speed is obtained with reference to the VOBU_SRI shown in FIG. 8. That is, if an FWDI n (n=1~15, 20, 60, 120, 240) or BWDI n which is an object to be reproduced is searched according to a corresponding speed, a start address of a corresponding VOBU is contained in its contents.

The microprocessor 500 reads, at step 16, the memory read address stored in the addresses 70–72 of the register of FIG. 4A and transmits the memory read address to the memory controller 508 of the data processor 200. Then the data processor 200 reads data stored in the memory read address from the memory 330 through the memory controller 508 and stores the data in the address 73 of the register of FIG. 4A.

The microprocessor 500 reads, at step 18, an FWDI_offset (or BWDI_offset). The FWDI_offset (or BWDI_offset) is a value stored in the address 73 of the register 270 after the data processor 200 reads data of 4 bytes shown in FIG. 8 from the memory 330. The FWDI_offset is a distance (sector) from a current navigation pack ID (NV_PCK_ID) to a jump ID (JP_ID) and indicates the contents of each item of the VOBU_SRI. That is, if an FWDI 1 of the VOBU_SRI is the jump ID to be next reproduced, the FWDI_offset is a value of 4 bytes contained in the FWDI 1 of the VOBU_SRI. At step 20, whether a current operation is a FF mode or a FB mode is checked. If it is a FF mode, the jump ID is calculated at step 22 by the following equation (2), and if it is a FB mode, the jump ID is calculated at step 24 by the following equation (3).

$$JP\_ID = CUR\_NVPCK\_ID + FWDI\_offset \tag{2}$$

$$JP\_ID = CUR\_NVPCK\_ID - BWDI\_offset \tag{3}$$

where CUR_NVPCK_ID is an address of the disk 100 of a current navigation pack. After the jump ID is calculated, the microprocessor 500 reads, at step 26, an offset value of an end address VOBU_1STREF_EA of a first reference (I) picture in the VOBU containing the current navigation pack NV_PCK. The VOBU_1STREF_EA is one of general information contained in the DSI. The offset value of the VOBU_1STREF_EA is a value of a corresponding VOBU. At step 28, a data transmission end ID (TR_E_ID) is calculated by the following equation (4) to obtain an absolute address:

$$TR\_E\_ID = CUR\_NVPCK\_ID + VOBU\_1STREF\_EA\_offset \tag{4}$$

After calculating the data transmission end ID, only I picture data of the current VOBU is transmitted to the video decoder 620 at step 30.

At step 32, the disk driving controller 400 is controlled to seek the jump ID calculated at step 22 (in the preferred embodiment, step 22 is used based upon the above described assumption) in order to transmit the I picture data of the next VOBU. Then data corresponding to the jump ID of the disk 100 is read and descrambled and stored in the memory 330. If the navigation interrupt signal NV_INT is generated, a series of processes for transmitting only the I picture of the corresponding VOBU to the video decoder 620 through the steps 10 to 32 and reading the data corresponding to the jump ID are repeated. Therefore, only the I picture data of the selected VOBU is transmitted to the video decoder 620, thereby performing the operation of the FF mode.

While there is shown and described a specific preferred embodiment of the present invention, it will be understood by those skilled in the art that various changes in form and details may be made without departing from the spirit and scope of the present invention as defined by the appended claims.

As described above, the microprocessor of a digital video disk reproducing system is able to obtain navigation related information within a fast period of time, and the FF, FB or other reproducing speeds of data from the digital video disk can be increased.

What is claimed is:

1. A control apparatus for reproducing data from a digital video disk, comprising:
   a descrambler to descramble said data which is read from said digital video disk, demodulated and error-corrected, and to detect a navigation pack sector from said descrambled data;
   a navigation interrupt generator to generate a navigation interrupt if said descrambler detects said navigation pack sector;
   a memory to store said descrambled data; and
   a microprocessor to determine a next reproducing position of said digital video disk based upon said navigation pack sector contained in said descrambled data by accessing said memory if said microprocessor receives said navigation interrupt, and to control a driving of said digital video disk.

2. A control apparatus for reproducing data from a digital video disk as claimed in claim 1, further comprising a register to store a navigation pack unit number and an identification address of a video object unit of said descrambled data.

3. A control apparatus for reproducing data from a digital video disk, comprising:
   a data processor including
      a descrambler to descramble data which is read from said digital video disk, demodulated and error-corrected, to detect a navigation pack sector from said descrambled data,
      a register to store a navigation pack unit number and an identification address of a video object unit of said descrambled data, and
      a navigation interrupt generator to generate a navigation interrupt if said descrambler detects said navigation pack sector;
   a memory to store said descrambled data from said data processor; and
   a microprocessor to read said navigation pack unit number and said identification address of a corresponding video object unit from said register to calculate a memory address when said microprocessor receives said navigation interrupt, to read said data corresponding to said memory address to determine a current position, to calculate a jump identification according to a fast forward or fast rewind mode, to read an offset value of an end address of an I picture of said video object unit containing a currently detected navigation pack unit to calculate a data transmission end identification, to transmit said I picture, and to control driving of said digital video disk to reproduce a next video object unit by seeking said jump ID.

4. A control method for a control apparatus which reproduces data from a digital video disk and includes means for detecting a navigation pack sector from said data reproduced from said digital video disk and means for storing a navigation pack unit number and an identification address of a video object unit of said data reproduced from said digital video disk, said method comprising the steps of:
   (a) if said navigation pack sector is detected, reading said navigation pack unit number and said identification address of a corresponding video object unit, and generating a navigation interrupt;
   (b) calculating a memory address by using said navigation pack unit number and said identification address, and reading said data corresponding to said memory address to determine a current position;
   (c) calculating a jump identification according to a fast forward or a fast backward mode, and reading an offset value of an end address of an I picture of the video object unit containing a currently detected navigation pack unit to calculate a data transmission end identification;
   (d) transmitting said I picture; and
   (e) seeking said jump identification, and returning to said step (a) in order to process a next video object unit of said data reproduced from said digital video disk.

5. A control apparatus for reproducing data from an optical disk, comprising:
   a data processor which detects a navigation pack sector from said data and generates a navigation interrupt if said data processor detects said navigation pack sector;
   a memory to store said data;
   a register portion which stores navigation information of the optical disk and said memory; and
   a microprocessor which calculates a next reproducing position of the optical disk based upon the stored navigation information of said memory and accesses said memory according to the calculated next reproducing position if said microprocessor receives said navigation interrupt.

6. A control apparatus as claimed in claim 5, wherein said microprocessor receives said navigation interrupt in response to one of a fast forward and a fast backward command.

7. A control apparatus as claimed in claim 5, wherein said register portion stores a navigation pack unit number and an identification address of a video object unit of said data as said navigation information.

8. A control apparatus as claimed in claim 6, wherein said register portion stores a navigation pack unit number and an identification address of a video object unit of said data as said navigation information.

9. A control apparatus for reproducing data from an optical disk, the control apparatus comprising:
   a data processor comprising a descrambler to descramble said data:
   a memory to store said descrambled data;
   said data processor comprising a register portion to store navigation information of the optical disk and said memory, wherein said register portion comprises:
      a first register to store addresses of said memory to read-access said memory,
      a second register to store addresses of said memory in which navigation pack sectors are stored as navigation pack unit numbers, and a third register to store addresses of the optical disk in which said navigation pack sectors are stored as identification addresses;

said descrambler detecting a navigation pack sector from said descrambled data;

said data processor further comprising a navigation interrupt generator to generate a navigation interrupt if said descrambler detects said navigation pack sector, said data processor determining that a new video object unit is started in response to said descrambler detecting said navigation pack sector, storing said descrambled data and generating said navigation interrupt in response to said descrambler generating said descrambled data, and then, determining and storing a corresponding navigation pack unit number and identification address in said second and third registers, respectively; and a microprocessor to access said navigation information to control reproduction of the data from the optical disk, wherein said microprocessor reads said navigation pack unit number and said identification address of a currently detected video object unit from said second and third registers respectively, and determines a corresponding address to read-access said memory from said first register based upon said navigation pack unit number of said currently detected video object unit.

10. A control apparatus for reproducing data from an optical disk, comprising:

a data processor comprising:
a descrambler to descramble said data and to detect a navigation pack sector;
a navigation interrupt generator to generate a navigation interrupt if said descrambler detects said navigation pack sector;
a memory to store said descrambled data;
said data processor further comprising a register portion to store navigation information of said optical disk and said memory; and
a microprocessor to access said navigation information to control reproduction of said data from said optical disk, wherein:
said microprocessor determines a next reproducing position of said optical disk based upon said navigation pack sector in said descrambled data by accessing said memory if said microprocessor receives said navigation interrupt; and
said register portion comprises:
a first register to store addresses of said memory to read-access said memory,
a second register to store addresses of said memory in which navigation pack sectors are stored as navigation pack unit numbers, and
a third register to store addresses of the optical disk in which said navigation pack sectors are stored as identification addresses;

said data processor determines that a new video object unit is started in response to said descrambler detecting said navigation pack sector, stores said descrambled data and generates said navigation interrupt in response to said descrambler generating said descrambled data, and then, determines and stores a corresponding navigation pack unit number and identification address in said second and third registers, respectively; and said microprocessor reads said navigation pack unit number and said identification address of a currently detected video object unit from said second and third registers respectively, and determines a corresponding address to read-access said memory from said first register based upon said navigation pack unit number of said currently detected video object unit.

11. A control apparatus as claimed in claim 9, wherein said navigation interrupt generator comprises:
a shift register to sequentially store said descrambled data from said descrambler; and
a pattern detector to detect a pack header contained in said navigation pack sector of said sequentially stored descrambled data, and in response, generating said navigation interrupt to inform said microprocessor that said pack header has been detected.

12. A control apparatus as claimed in claim 10, further comprising:
a shift register to sequentially store said descrambled data from said descrambler; and
a pattern detector to detect a pack header contained in said navigation pack sector of said sequentially stored descrambled data, and in response, generating said navigation interrupt to inform said microprocessor that said pack header has been detected.

13. A control apparatus as claimed in claim 9, wherein said first register stores said addresses to read-access said memory in first units of a first size and said second register stores said addresses of said memory in which navigation pack sectors are stored in second units of a second size larger than said first size.

14. A control apparatus as claimed in claim 13, wherein said first units are bytes and said second units are 2 kilobytes.

15. A control apparatus as claimed in claim 10, wherein said first register stores said addresses to read-access said memory in first units of a first size and said second register stores said addresses of said memory in which navigation pack sectors are stored in second units of a second size larger than said first size.

16. A control apparatus as claimed in claim 15, wherein said first units are bytes and said second units are 2 kilobytes.

17. A control apparatus as claimed in claim 9, wherein said microprocessor determines a corresponding address to read-access said memory based upon the following equation:

$$ADD=2.48 \times U_{NO}+OFF1+OFF2,$$

wherein $U_{NO}$ indicates said navigation pack unit number, OFF1 is an offset value of a VOBU_SRI representative of a number of bytes including a position of said VOBU_SRI following a DSI_GI of a DSI_PCK from a start position of a corresponding navigation pack sector, and OFF2 is an offset value corresponding to a different speed of said VOBU_SRI representative of a number of bytes including a different speed term within said VOBU_SRI from said start position of said VOBU_SRI, where VOBU_SRI means Video Object Unit Search Information, DSI_GI means Disk Search Information-General Information and DSI_PCK means Disk Search Information Pack.

18. A control apparatus as claimed in claim 10, wherein said microprocessor determines a corresponding address to read-access said memory based upon the following equation:

$$ADD=2.48 \times U_{NO}+OFF1+OFF2,$$

wherein $U_{NO}$ indicates said navigation pack unit number, OFF1 is an offset value of a VOBU_SRI representative of a number of bytes including a position of said VOBU_SRI following a DSI_GI of a DSI_PCK from a start position of a corresponding navigation pack sector, and OFF2 is an offset value corresponding to a different speed of said VOBU_SRI representative of a number of bytes including a different speed term within said VOBU_SRI from said start position of said VOBU_SRI, where VOBU_SRI means Video Object Unit Search Information, DSI_GI means Disk Search Information-General Information and DSI_PCK means Disk Search Information Pack.

19. A control apparatus as claimed in claim 11, wherein said microprocessor determines a corresponding address to read-access said memory based upon the following equation:

$$ADD = 2.48 \times U_{NO} + OFF1 + OFF2,$$

wherein $U_{NO}$ indicates said navigation pack unit number, OFF1 is an offset value of a VOBU_SRI representative of a number of bytes including a position of said VOBU_SRI following a DSI_GI of a DSI_PCK from said pack header of a corresponding navigation pack sector, and OFF2 is an offset value corresponding to a different speed of said VOBU_SRI representative of a number of bytes including a different speed term within said VOBU_SRI from said pack header of said VOBU_SRI, where VOBU_SRI means Video Object Unit Search Information, DSI_GI means Disk Search Information-General Information and DSI_PCK means Disk Search Information Pack.

20. A control apparatus as claimed in claim 12, wherein said microprocessor determines a corresponding address to read-access said memory based upon the following equation:

$$ADD = 2.48 \times U_{NO} + OFF1 + OFF2,$$

wherein $U_{NO}$ indicates said navigation pack unit number, OFF1 is an offset value of a VOBU_SRI representative of a number of bytes including a position of said VOBU_SRI following a DSI_GI of a DSI_PCK from said pack header of a corresponding navigation pack sector, and OFF2 is an offset value corresponding to a different speed of said VOBU_SRI representative of a number of bytes including a different speed term within said VOBU_SRI from said pack header of said VOBU_SRI, where VOBU_SRI means Video Object Unit Search Information, DSI_GI means Disk Search Information-General Information and DSI_PCK means Disk Search Information Pack.

21. A control apparatus as claimed in claim 12, wherein said pattern detector detects a system header start code from a first position of said navigation pack sector of said sequentially stored descrambled data and then detects said pack header from a second position of said navigation pack sector of said sequentially stored descrambled data, detects a sub stream ID of said navigation pack sector of said sequentially stored descrambled data and generates said navigation interrupt if said sub stream ID has a particular value.

22. A control method as claimed in claim 4, further comprising the step of determining a data transmission end ID based upon an address of a current navigation pack sector and an offset value of said end address of said I picture of the video object unit containing said current navigation pack sector, prior to said step (d).

23. A control method as claimed in claim 4, said wherein only said I picture, without B and P pictures, is transmitted.

24. A control method as claimed in claim 22, said wherein only said I picture, without B and P pictures, is transmitted.

25. A control method for reproducing data from an optical disk, comprising:

reading and descrambling said data from the optical disk;

detecting a navigation pack sector from said descrambled data;

generating a navigation interrupt where the navigation pack sector is detected;

storing a disk address of a current video object unit which includes the detected navigation pack sector; and calculating a next reproducing position of the optical disk based on the stored disk address, the navigation interrupt and one of a fast forward command and a fast backward command.

26. An apparatus for reproducing data from a digital video disk, comprising:

a detector which detects a navigation pack sector in said data;

a navigation interrupt generator which generates a navigation interrupt if a navigation pack sector is detected;

a register which stores a navigation pack unit number and an identification address of a video object unit of said data, and a microprocessor which reads said navigation pack unit number and said identification address of said video object unit from said register, and where said microprocessor receives said navigation interrupt, calculates a memory address, reads said data corresponding to said memory address, determines a current position, calculates a jump identification (jump ID) according to a fast forward or a fast backward mode, reads an offset value of an end address of an I picture of said video object unit containing a currently detected navigation pack unit, calculates a data transmission end identification and transmits said I picture and controls driving said digital video disk to reproduce a next video object unit by seeking said jump ID.

27. The method of claim 25, wherein the method further comprises:

calculating an end location of an I picture of the current video object unit; and terminating the reproducing of the current video object after the I picture of the current video object is reproduced.

28. A control apparatus for reproducing data from a digital video disk comprising:

a descrambler to descramble said data and to detect a navigation pack sector from said descrambled data;

a navigation interrupt generator to generate a navigation interrupt if said descrambler detects said navigation pack sector;

a memory to store said descrambled data; and a microprocessor which:

determines a next reproducing position of said digital video disk based upon said navigation pack sector contained in said descrambled data, said navigation interrupt and one of a fast forward and a fast backward command, and controls access to said memory to reproduce video from said next reproducing position, and to control a driving of said digital video disk.

* * * * *